United States Patent [19]

Walker

[11] Patent Number: 5,894,758
[45] Date of Patent: Apr. 20, 1999

[54] ASSISTED LEVER-SHIFTED TRANSMISSION

[75] Inventor: James M. Walker, Kalamazoo, Mich.

[73] Assignee: Eaton Corporation, Cleveland, Ohio

[21] Appl. No.: 08/990,678

[22] Filed: Dec. 15, 1997

[51] Int. Cl.$^6$ .................................................. F16H 59/04
[52] U.S. Cl. ..................................... 74/335; 477/109
[58] Field of Search .......................... 74/335; 477/79, 477/83, 109, 904

[56] References Cited

U.S. PATENT DOCUMENTS

| | | | |
|---|---|---|---|
| 4,570,502 | 2/1986 | Klatt | 74/335 |
| 4,593,580 | 6/1986 | Schulze . | |
| 4,722,248 | 2/1988 | Braun | 477/78 |
| 4,850,236 | 7/1989 | Braun | 74/337 |
| 5,167,311 | 12/1992 | Satoh et al. | 74/335 X |
| 5,435,212 | 7/1995 | Menig | 74/745 |
| 5,582,558 | 12/1996 | Palmeri et al. | 477/109 |
| 5,651,292 | 7/1997 | Genise | 74/745 |
| 5,743,143 | 4/1998 | Carpenter et al. | 74/335 |

*Primary Examiner*—Charles A. Marmor
*Assistant Examiner*—Sherry Lynn Estremsky
*Attorney, Agent, or Firm*—Howard D. Gordon

[57] ABSTRACT

A partially automated transmission system (100) and method for controlling same is provided. The system includes a manually shifted transmission (10), preferably a compound transmission having a splitter and/or range auxiliary section (14) and a manually shifted main section (12). The main section is shifted by a manual shift lever (57). In a preferred embodiment, the auxiliary section is controlled by an auxiliary section actuator (116) under control from a system ECU (146). A sensor (56) is provided for sensing the position of the shift lever and for providing a signal indicative thereof. A control parameter having a value indicative of the rate of change of shift lever position (d/dt (lever position)) is determined and used as a system control parameter.

26 Claims, 4 Drawing Sheets

5,894,758

ASSISTED LEVER-SHIFTED TRANSMISSION

BACKGROUND OF THE INVENTION

The present invention is related to the following co-pending U.S. patent applications, all assigned to EATON CORPORATION, the assignee of this application:

Ser. No. 08/439,908 faied May 12, 1995 AUTOMATIC AND MANUAL SPLITTER SHIFTING CONTROL ASSEMBLY Ser. No. 08/649,829 filed Apr. 30, 1996 SYNCHRONIZING AND GEAR ENGAGEMENT SENSING LOGIC FOR AUTOMATED MECHANICAL TRANSMISSION SYSTEM Ser. No. 08/649,830 filed Apr. 30, 1996 SEMI-AUTOMATIC SHIFT IMPLEMENTATION Ser. No. 08/666,164 filed Jun. 19, 1996 AUTOMATED TRANSMISSION SYSTEM CONTROL WITH ZERO ENGINE FLYWHEEL TORQUE DETERMINATION

FIELD OF THE INVENTION

The present invention relates to partially automated or automatically assisted, lever-shifted, vehicular mechanical transmission systems. In particular, the present invention relates to a partially automated, lever-shifted transmission system having means to determine the position and rate of change of the position of the manually operated shift lever or shift selector and having a controller for controlling the operation of the system as a function of the rate of change of the position of the shift lever.

DESCRIPTION OF THE PRIOR ART

Partially automated or assisted, lever-shifted vehicular mechanical transmission systems are known in the prior art, as may be seen by reference to U.S. Pat. Nos. 4,722,248; 4,850,236; 4,593,580; 4,595,986; 5,435,212; 5,582,558 and 5,651,292, the disclosures of which are incorporated herein by reference. Sensors for sensing the position of a shift lever, in both the "X—X" and the "Y—Y" directions, are known in the prior art, as may be seen by reference to copending U.S. Ser. No. 08/695,052, entitled TRANSMISSION SHIFTING MECHANISM AND POSITION SENSOR and assigned to EATON CORPORATION, assignee of this application, to U.S. Pat. Nos. 4,592,249; 5,428,290; 5,566,579 and 5,578,904, and to published U.K. Pat. App. No. 2,277,784A, the disclosures of which are incorporated herein by reference.

Partially automated mechanical transmission systems having automatic splitter shifting and manual main section shifting are known in the prior art, as may be seen by reference to aforementioned U.S. Pat. No. 5,435,212.

Compound mechanical transmissions of the range, splitter or combined range-and-splitter type are well known in the prior art, as may be seen by reference to U.S. Pat. Nos. 3,799,002; 4,754,665; 4,974,468; 5,000,060; 5,370,013 and 5,390,561, the disclosures of which are incorporated herein by reference.

Partially automated mechanical transmission systems providing automatic assistance, such as automatic engine fuel control, for manual lever-shifted transmissions are known in the prior art, as may be seen by reference to U.S. Pat. Nos. 4,593,580; 5,569,115; 5,571,059; 5,573,477 and 5,582,558, the disclosures of which are incorporated herein by reference, and to aforementioned co-pending U.S. Ser. Nos. 08/649,829, 08/649,830, 08/649,831 and 08/666,164. These systems utilize automatic engine fueling controls and/or range and/or slitter shift actuators, actuated by a driver and indication of an intent to shift, allowing an old gear to be disengaged and a new or target gear to be engaged without requiring the driver to manipulate the clutch pedal (required only for vehicle launch and stop) or the throttle pedal.

SUMMARY OF THE INVENTION

The present invention improves the operation of the prior art assisted, manually shifted transmission systems by determining the value of a parameter indicative of a derivative with respect to time, such as the rate of change of shift lever position, and controlling the system as a function of the value of that parameter. By way of example, a relatively rapid shift lever movement may be taken as an indication of a request or requirement for a more aggressive, automatically implemented splitter or range shift than would otherwise be implemented.

This and other objects and advantages of the present invention will become apparent from a reading of the following description of the preferred embodiment taken in connection with the attached drawings.

BRIEF DESCRIPTION OF THE DRAWINGS

Although FIG. 1 illustrates a system in which the present invention is particularly useful, the present invention is also applicable to other types of automatically assisted, lever-shifted transmissions.

DESCRIPTION OF THE PREFERRED EMBODIMENT

Figure 1:
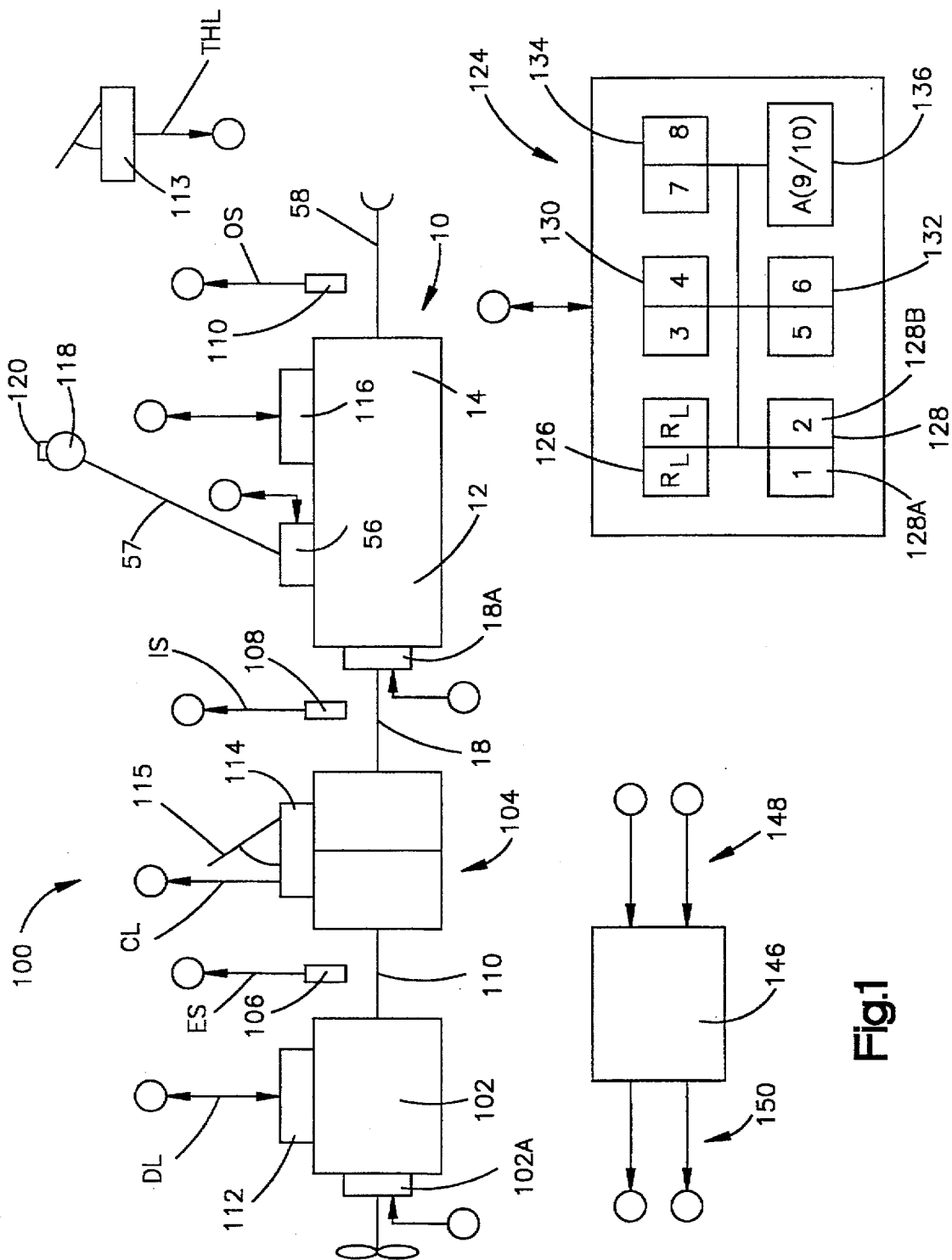
FIGS. 1 is a schematic illustration of a partially automated vehicular transmission system including a manual shift lever-shifted transmission utilizing the control system/method of the present invention.

In a preferred embodiment of the present invention, the forward shifting of a combined range-and-splitter-type compound transmission 10, comprising a main section 12 coupled to an auxiliary section 14, is semi-automatically implemented/assisted by the vehicular semi-automatic transmission system 100, illustrated in FIG. 1. Main section 12 includes input shaft 18, which is operatively coupled to the drive or crank shaft 101 of the vehicle engine 102 by master clutch 104, and output shaft 58 of auxiliary section 14 is operatively coupled, commonly by means of a drive shaft, to the drive wheels of the vehicle (not shown). Transmission 10 may be of the type disclosed in aforementioned U.S. Pat. Nos. 5,370,013 and 5,390,561.

The change-gear ratios available from main transmission section 12 are manually selectable by manually positioning the shift lever 57 according to the shift pattern prescribed to engage the particular change gear ratio of main section 12 desired. As will be described, manipulation of the master clutch 104 (other than when bringing the vehicle to or when launching the vehicle from an at-rest condition) and manual synchronizing is not required. The system includes means to signal an intent to shift into a target ratio and will automatically take actions to minimize or relieve torque-lock conditions, allowing, if required, an easier shift into main section neutral from the engaged main section ratio and further allowing required splitter shifts to be automatically and rapidly completed upon a shift into neutral. Upon sensing a neutral condition, the system will cause the engine to rotate at a substantially synchronous speed for engaging a target gear ratio.

The system 100 includes sensors 106 for sensing engine rotational speed (ES), 108 for sensing input shaft rotational speed (IS), and 110 for sensing output shaft rotational speed (OS) and providing signals indicative thereof. As is known, with the clutch 104 engaged and the transmission engaged in a known gear ratio, ES=IS=OS*GR (see U.S. Pat. No. 4,361,060).

Engine 102 is electronically controlled, including an electronic controller 112 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 113 may be provided or throttle position (THL) may be sensed from the data link. Gross engine torque ($T_{EG}$) and base engine friction torque ($T_{BEF}$) also are available on the data link.

Shift lever 57 will operate a shifting mechanism, such as a shift bar housing assembly or a single shift shaft, as illustrated in U.S. Pat. Nos. 4,920,815; 4,974,468 and 5,481,170, the disclosures of which are incorporated herein by reference. A sensor assembly 56 provides a signal indicative of the "X—X" and "Y—Y" position of the shift lever. Preferably, the sensor assembly 56 will provide a signal or signals continuously indicative of shift lever and shift mechanism position.

A manual clutch pedal 115 controls the master clutch, and a sensor 114 provides a signal (CL) indicative of clutch-engaged or -disengaged condition. The condition of the clutch also may be determined by comparing engine speed to input shaft speed. A splitter actuator 116 is provided for operating the splitter clutch in accordance with command output signals. The shift lever 57 has a knob 118 which contains selector switch 120 by which a driver's intent to shift may be sensed. A preferred embodiment of selector switch 120 includes a pivotably mounted rocker member to be pivoted to select an up- or downshift, respectively. The rocker may be moved in the direction of the arrows and then released to provide an "up" or "down" pulse or may be moved to and retained at the "up" or "down" positions to achieve different control results, as will be described in detail below. The rocker may be used to provide multiple pulses to request a skip shift (see U.S. Pat. No. 4,648,290). Alternatively, rocker 120 may be replaced by a toggle, pressure-sensitive surfaces, separate "up" and "down" buttons, or the like.

A driver's control display unit 124 includes a graphic representation of the six-position shift pattern with individually lightable display elements 126, 128, 130, 132, 134 and 136 representing each of the selectable engagement positions. Preferably, each half of the shift pattern display elements (i.e., 128A and 128B) will be individually lightable, allowing the display to inform the driver of the lever and splitter position for the engaged and/or target ratio. In a preferred embodiment, the engaged ratio is steadily lit, while the target ratio is indicated by a flashing light.

The system includes a control unit 146, preferably a microprocessor-based control unit of the type illustrated in aforementioned U.S. Pat. Nos. 4,595,986; 4,361,065 and 5,335,566, for receiving input signals 148 and processing same according to predetermined logic rules to issue command output signals 150 to system actuators, such as the splitter and/or range section actuator 116, the engine controller 112 and the display unit 124. A separate system controller 146 may be utilized, or the engine ECU 112 communicating over an electronic data link may be utilized.

As shown in co-pending patent application U.S. Ser. No. 08/597,304, the splitter actuator 116 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

In the illustrated preferred embodiment, forward dynamic splitter-only shifts, other than for the more fully automatic 9-10 and 10-9 splitter shifts, such as third-to-fourth and fourth-to-third shifts, are automatically implemented upon driver request by use of the selector switch 120. By way of example, assuming a three-position splitter actuator, upon sensing that a splitter shift is required, by receiving a single "up" signal when engaged in first, third, fifth or seventh, or receiving a single "down" signal when engaged in second, fourth, sixth or eighth, the ECU 146 will issue commands to the actuator 116 to bias the actuator toward neutral, and to engine controller 112 to minimize or break torque. This may be accomplished by causing the engine to dither about a zero flywheel torque value (see aforementioned U.S. Pat. No. 4,850,236). As soon as splitter neutral is sensed, the engine will be commanded to a substantially synchronous engine speed for the target gear ratio at current output shaft speed ($ES=IS=OS*GR_T \pm E_{RROR}$). The engagement is timed, in view of reaction times and shaft speeds and accelerations, to occur just off synchronous to prevent clutch butting. Automatic splitter shifting of this general type is illustrated in aforementioned U.S. Pat. Nos. 4,722,248 and 5,435,212.

The more fully automated 9-10 and 10-9 splitter shifts are implemented in the same manner but are initiated by the ECU, not the selector switch 120, in accordance with predetermined shift schedules.

The engaged and neutral (not engaged) conditions of transmission 10 may be sensed by comparing the input shaft/output shaft rotational speeds to known gear ratios ($IS/OS=GR_{i=1 \text{ to } 10} \pm Y$?) for a period of time. Position sensors may be utilized in lieu of or in addition to input shaft and output shaft speed logic.

When synchronizing to engage a target ratio, the engine is directed to achieve and remain at a speed about 30 to 100 RPM (preferably about 60 RPM) above or below (preferably below) true synchronous speed ($ES_{SYNCHRO}=(OS \times GR_T)-45$ RPM) to achieve a good quality law clutch engagement without butting. To verify engagement of a target ratio, the system looks for input shaft speed equaling the product of output shaft speed and the numerical value of the target ratio, plus or minus about 10 to 30 RPM ($IS=(OS*GR_T) \pm 20$ RPM) for a period of time, about 100 to 400 milliseconds.

The foregoing logic allows transmission engaged and neutral conditions to be determined on the basis of input and output shaft speeds without false engagement sensing caused by engine synchronizing for engagement of a target ratio (see co-pendang U.S. Ser. No. 08/790,210).

When in an even numbered ratio (i.e., when in the high splitter ratio) and a single upshift is required, a lever upshift (with splitter downshift) is appropriate and the system, if requested by the driver, will automatically assist in implementing same. Similarly, when in an odd numbered ratio (i.e., when in the low splitter ratio) and a single downshift is requested, a lever downshift (with splatter upshift) is appropriate and the system, if requested by the driver, will automatically assist in implementing same. It is noted that in system 100, splitter-only shifts may be automatically implemented, while lever shifts, with accompanying splitter shifts, require driver initiation and main section jaw clutch manipulation.

When a combined lever-and-splitter shift is requested, a single pulse of the selector in the appropriate direction (as opposed to maintaining the rocker in the appropriate displaced position) is taken as simply a request for an appropriate splitter shift with no automatic assistance, and the splitter will be preselected to shift to the appropriate splitter position and will do so when the operator manually shifts to neutral or otherwise breaks torque.

The driver is then required to engage the appropriate main section ratio without intervention by the controller 148. This is substantially identical to the operation of a fully manual splitter-type transmission.

If the driver wishes automatic assistance for a combined lever-and-splitter shift, the rocker member of the selector is moved to and retained (for at least 50 milliseconds to 1 second) in the appropriate position to request an assisted up- or downshift. The controller 146, upon receiving such a request, will automatically cause (for a period of about 2–5 seconds) the engine to be fueled to dither about a zero flywheel torque, thereby reducing or eliminating torque lock conditions and allowing the operator to easily manually shift to main section neutral (see U.S. Pat. Nos. 4,850,236 and 5,573,477). The display 124 will steadily light the old gear ratio and flash or otherwise indicate the selected ratio. The ECU 146, will sense for neutral conditions by comparing the ratio of input shaft speed (IS) to output shaft speed (OS) to known gear ratios. Alternatively or in combination, position sensors may be utilized. The logic will determine the identity of the target gear ratio $GR_T$ as a direct or indirect function of current gear ratio $GR_C$ and the direction of the requested shift.

When main section neutral is sensed, the display element corresponding to the disengaged gear ratio will not be lighted, the splitter will automatically be caused to shift to the appropriate splitter ratio and the engine will automatically be caused (for a period of about 2–5 seconds) to rotate at a substantially synchronous speed ($ES=OS*GR_T$) for engaging the target gear ratio ($GR_T$), allowing the operator to easily manually utilize the shift lever 57 to engage the indicated main section ratio. Preferably, the engine will automatically be caused to rotate at an offset from or to dither about true synchronous speed (see U.S. Pat. Nos. 5,508,916 and 5,582,558). Upon sensing engagement of the target ratio, the display indicator element corresponding to the newly engaged ratio will be steadily lit and engine fuel control will be returned to the operator. The assisted combined lever and splitter shift is accomplished without requiring the operator to manipulate the clutch pedal 115 or the throttle pedal 113.

When in or after shifted to the "A" position 136 (i.e., 9/10), the ECU 146 will command the fuel controller 112 and splitter operator 116 to automatically select and implement appropriate 9–10 and 10–9 shifts. Automatic operation within an upper group of ratios is disclosed in aforementioned U.S. Pat. Nos. 4,722,248; 4,850,236 and 5,498,195. Systems incorporating this feature are sold by Eaton Corporation under the "Super 10 Top-2" trademark and by Dana Corporation under the "Automate-2" trademark.

To shift out of the "A" position, the operator may simply use the clutch pedal 115, throttle pedal 113 and shift lever 57 to perform a fully manual shift to another ratio. If an assisted lever shift from "A" to eighth (or a lower ratio) as required, the selector rocker 120 may be retained in the "down" position, which will cause the ECU 146 to command the fuel controller 112 and/or splitter actuator 116 to assist the lever or combined lever-and-splitter shift from the engaged "A" ratio (ninth or tenth) to a selected target ratio. Pulses of the selector (and "up" continuing displacements), when in the "A" position, are ignored by the ECU.

Although the preferred embodiment does not have an operator on/off switch for disabling the system, at is contemplated that a fault-tolerant mode will be provided whereby the driver may use the selector 120 to select splitter shifts or, if that is not possible, the transmission 10 will be operated as a wide-step, fully manual, 5-speed, or at least 3-speed (½, ¾ and ⅚) transmission for limp-home and/or pull-off-the-road purposes.

In the illustrated preferred embodiment of the present invention, fueling to break torque will involve causing the engine to develop a gross torque ($T_{EG}$), which will result in a dither about zero flywheel torque ($T_{FW}=0$). As described in aforementioned U.S. Pat. No. 5,508,916, a similar dither technique may be utilized to assure full engagement of the jaw clutch members associated with a target gear ratio.

Upon completion of a shift and confirmation thereof, control of fueling is returned to the operator. The clutch pedal 115 is not intended to be used, except for stopping or for start-from-stop operations. If the clutch is manually disengaged during a shifting operation, throttle control is immediately returned to the operator.

Figure 2:
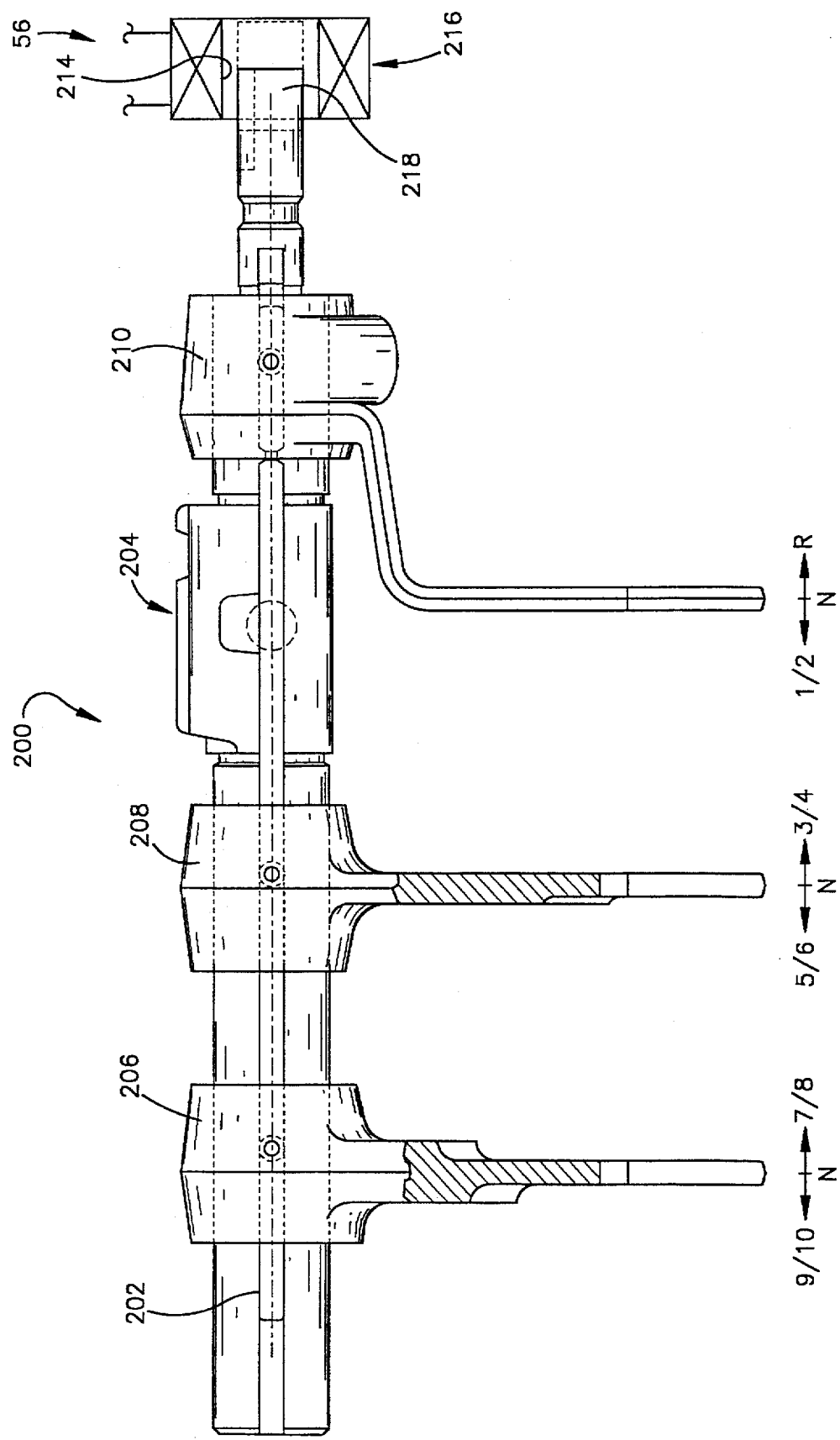
FIGS. 2 and 3 are schematic illustrations of a sensor assembly for providing signals indicative of the axial and rotational positions of a single shift shaft mechanism usable to manually shift the transmission system illustrated in FIG. 1.
Figure 3:
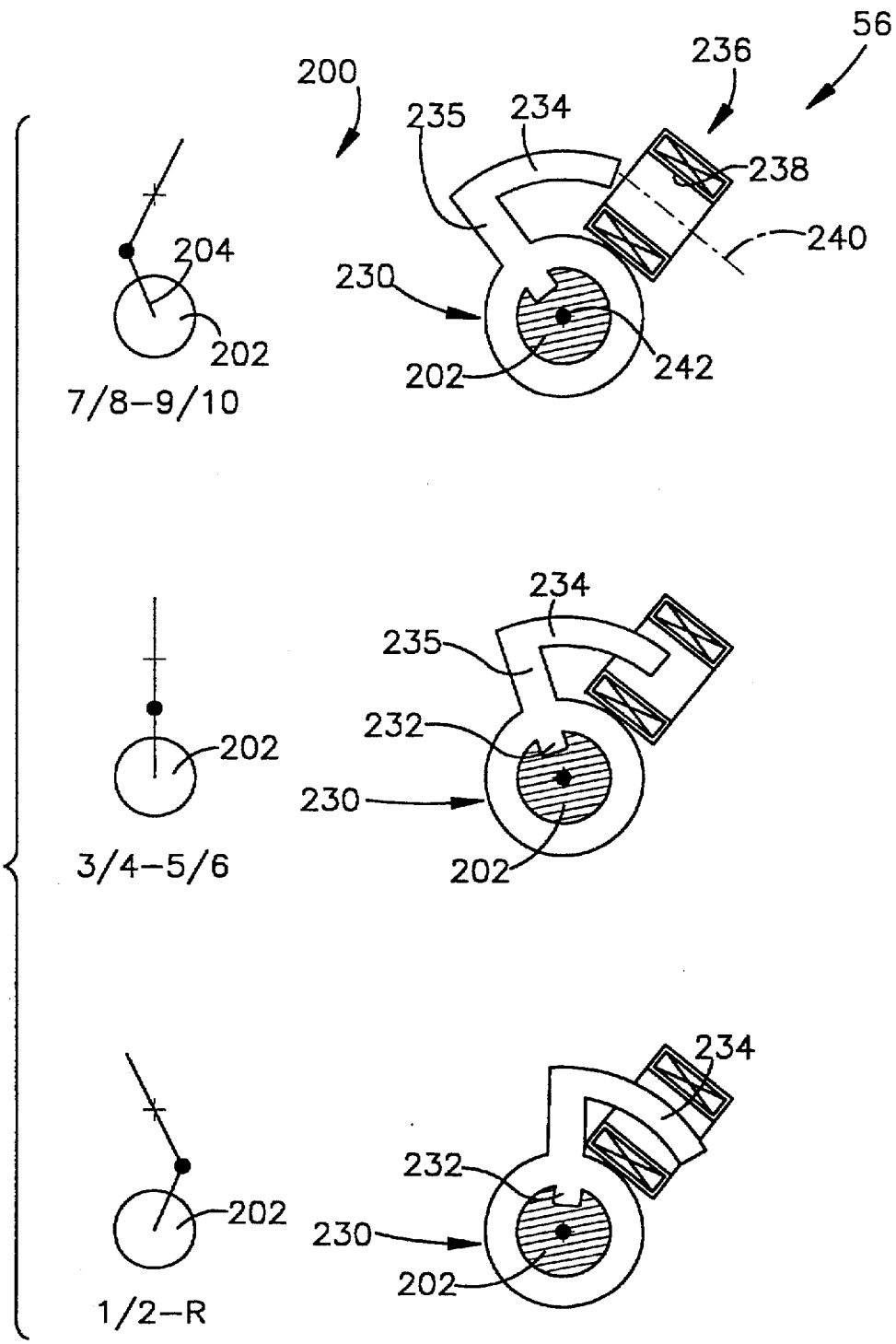

FIGS. 2 and 3 schematically illustrate a sensor assembly 56 for providing signals indicative of the rotational and axial position of a single shift shaft mechanism 200. Briefly, shaft 202 is engaged at block 204 by shift lever 57 and is rotated to one of three positions to select the "9/10–7/8" shift fork 206, the "5/6–3/4" shift fork 208, or the "1/2-R" shift fork 210. Shift shaft 202 is moved rightwardly or leftwardly from the axially centered or neutral ("N") position thereof to move a selected shift fork for engaging or disengaging a selected main section ratio.

The position sensor assembly 56 comprises two independent coils 216 and 236 which will provide signals, such as magnitude of voltage or current, indicative of the axial and rotational positions, respectively, of the shift shaft 202. The ferromagnetic end 218 of shaft 202 variably extends into bore 214 of coil 216, depending upon the axial position of shaft 202, while the ferromagnetic extension 234 of member 235 rotationally fixed to shaft 202 will variably extend into bore 238 of coil 236, depending upon the rotational position of shift shaft 202. The signals from coils 216 and/or 236 may be differentiated with respect to time determine control parameters indicative of the rate of change of the position of the shaft 202 and/or the shift lever 57.

The rate at which the operator moves the shift lever (d/dt (shift lever position)) is an indication of the urgency with which he desires a shift to be implemented. While the assist shift logic may have a standard or a default mode wherein shift quality is an important consideration, if urgency is sensed, a rapid shift logic mode may be implemented wherein range and/or splitter shifts are commanded at more out-of-synchronous conditions (see aforementioned U.S. Pat. No. 5,651,292) and/or engine speed to cause zero drive line torque and/or to synchronize for engaging a target ratio is changed at a greater rate. Alternatively, in systems having an ECU-controlled actuator for controlling the master clutch, the engine brake (102A) and/or an input brake (18A), the rate of engagement of these devices may be varied as a function of the rate of shift lever movement. Thus, the rapid shift logic would result in a quicker but harsher (lower quality) shift.

Figure 4:
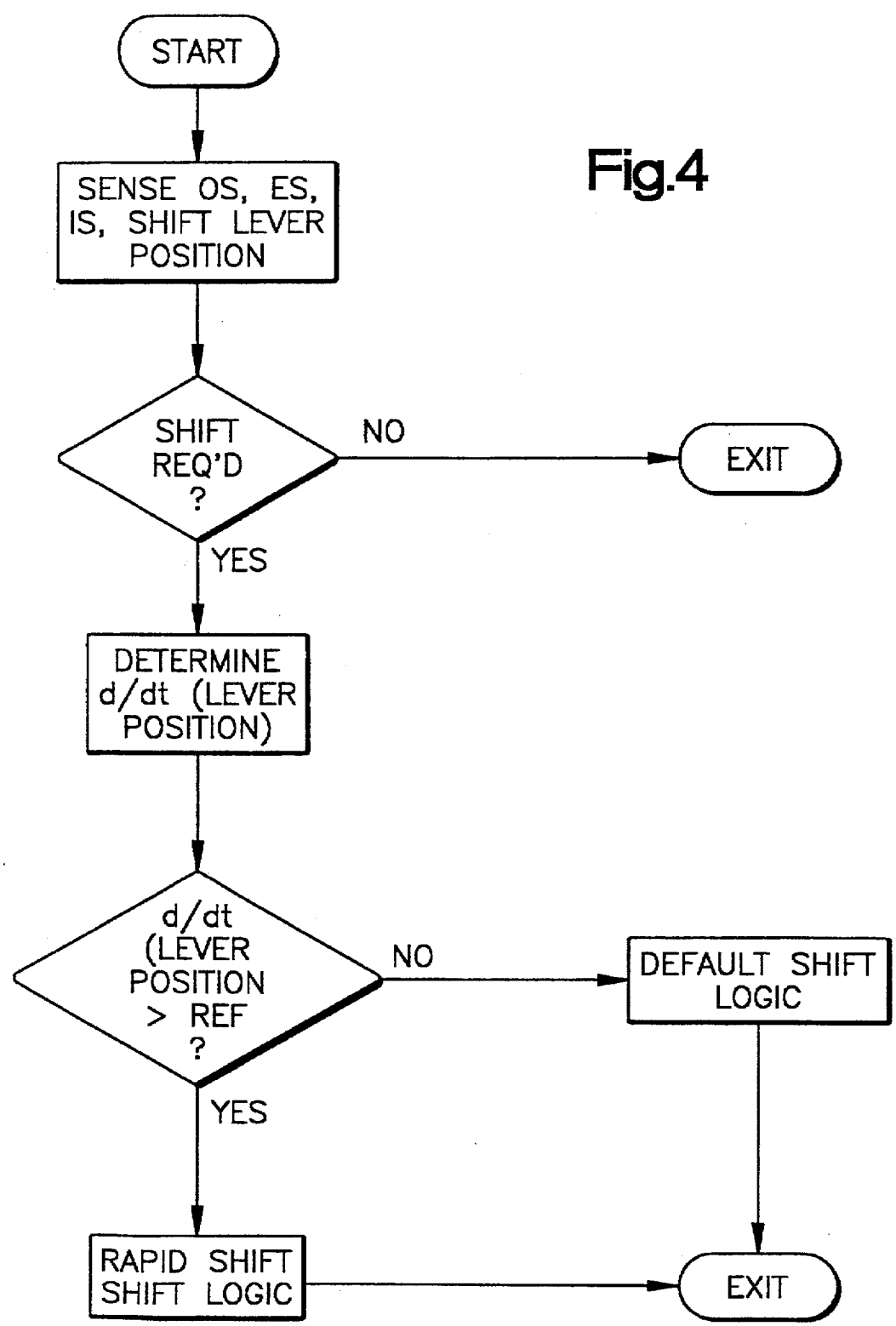
FIG. 4 is a schematic illustration, in flow chart format, of the control of the present invention.

FIG. 4 is a schematic illustration, in flow chart format, of the control system/method of the present invention.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A vehicular partially automated mechanical transmission system comprising a fuel-controlled engine, a mechanical transmission having an input shaft driven by the engine, an output shaft and a transmission section shifted by a manual shift lever, a sensor for providing an input signal indicative of the position of the shift lever, and a control unit for receiving input signals, including said signal indicative of the position of the shift lever, and processing same according to predetermined logic rules to issue command output signals to at least one system actuator, said logic rules including rules effective:

to determine a value of a control parameter indicative of a derivative with respect to time of the position of said shift lever; and to control said system as a function of the value of said control parameter.

2. The system of claim 1 wherein said sensor constantly provides a signal indicative of shift lever position.

3. The system of claim 1 wherein said transmission is a compound transmission having an auxiliary section connected in series with said transmission section shifted by a manual shift lever and said at least one system actuator is an actuator for shifting said auxiliary section.

4. The system of claim 3 wherein said logic rules further include rules effective to compare the value of said control parameter to a predetermined reference value.

5. The system of claim 4 wherein said logic rules include a default mode wherein shifting is commanded to achieve shift quality and a rapid shift mode wherein shifting is commanded to achieve more rapid shifting than obtained in the default mode, said logic rules effective to cause operation in the rapid shift mode if the value of said control parameter exceeds said reference value.

6. The system of claim 1 wherein said at least one system actuator is an actuator for controlling fueling of said engine.

7. The system of claim 6 wherein said logic rules further include rules effective to compare the value of said control parameter to a predetermined reference value.

8. The system of claim 7 wherein said logic rules include a default mode wherein shifting is commanded to achieve shift quality and a rapid shift mode wherein shifting is commanded to achieve more rapid shifting than obtained in the default mode, said logic rules effective to cause operation in the rapid shift mode if the value of said control parameter exceeds said reference value.

9. The system of claim 1 wherein said system includes a device (102A or 18A) for retarding input shaft rotational speed and said at least one system actuator is an actuator for controlling said device.

10. The system of claim 9 wherein said logic rules further include rules effective to compare the value of said control parameter to a predetermined reference value.

11. The system of claim 10 wherein said logic rules include a default mode wherein shifting is commanded to achieve shift quality and a rapid shift mode wherein shifting is commanded to achieve more rapid shifting than obtained in the default mode, said logic rules effective to cause operation in the rapid shift mode if the value of said control parameter exceeds said reference value.

12. The system of claim 1 wherein said logic rules further include rules effective to compare the value of said control parameter to a predetermined reference value.

13. The system of claim 12 wherein said logic rules include a default mode wherein shifting is commanded to achieve shift quality and a rapid shift mode wherein shifting is commanded to achieve more rapid shifting than obtained in the default mode, said logic rules effective to cause operation in the rapid shift mode if the value of said control parameter exceeds said reference value.

14. A method for controlling a vehicular partially automated mechanical transmission system comprising a fuel-controlled engine, a mechanical transmission having an input shaft driven by the engine, an output shaft and a transmission section shifted by a manual shift lever, a sensor for providing an input signal indicative of the position of the shift lever, and a control unit for receiving input signals and processing same according to predetermined logic rules to issue command output signals to at least one system actuator, said method comprising:

determining a value of a control parameter indicative of the rate of change with respect to time of the position of said shift lever, and controlling said system as a function of the value of said control parameter.

15. The method of claim 14 wherein said sensor continuously provides a signal indicative of the position of the shift lever.

16. The method of claim 14 wherein said transmission is a compound transmission having an auxiliary section connected in series with said transmission section shifted by a manual shift lever and said at least one system actuator is an actuator for shifting said auxiliary section.

17. The method of claim 16 further comprising comparing the value of said control parameter to a predetermined reference value.

18. The method of claim 17 wherein said logic rules include a default mode wherein shifting is commanded to achieve shift quality and a rapid shift mode wherein shifting is commanded to achieve more rapid shifting than obtained in the default mode, said method comprising causing operation in the rapid shift mode if the value of said control parameter exceeds said reference value.

19. The system of claim 14 wherein said at least one system actuator is an actuator for controlling fueling of said engine.

20. The method of claim 19 further comprising comparing the value of said control parameter to a predetermined reference value.

21. The method of claim 20 wherein said logic rules include a default mode wherein shifting is commanded to achieve shift quality and a rapid shift mode wherein shifting is commanded to achieve more rapid shifting than obtained in the default mode, said method comprising causing operation in the rapid shift mode if the value of said control parameter exceeds said reference value.

22. The system of claim 14 including a device for retarding rotational speed of said engine wherein said at least one system actuator is an actuator for controlling the operation of said device.

23. The method of claim 22 further comprising comparing the value of said control parameter to a predetermined reference value.

24. The method of claim 23 wherein said logic rules include a default mode wherein shifting is commanded to achieve shift quality and a rapid shift mode wherein shifting is commanded to achieve more rapid shifting than obtained in the default mode, said method comprising causing operation in the rapid shift mode if the value of said control parameter exceeds said reference value.

25. The method of claim 14, further comprising comparing the value of said control parameter to a predetermined reference value.

26. The method of claim 25 wherein said logic rules include a default mode wherein shifting is commanded to achieve shift quality and a rapid shaft mode wherein shifting as commanded to achieve more rapid shifting than obtained an the default mode, said method comprising causing operation in the rapid shaft mode if the value of said control parameter exceeds said reference value.

* * * * *